(12) United States Patent
Krasilnikov

(10) Patent No.: US 8,950,018 B2
(45) Date of Patent: Feb. 10, 2015

(54) RV MOUNTED SAUNA

(76) Inventor: Nikita Krasilnikov, Quincy, MA (US)

( * ) Notice: Subject to any disclaimer, the term of this patent is extended or adjusted under 35 U.S.C. 154(b) by 687 days.

(21) Appl. No.: 13/374,044

(22) Filed: Dec. 8, 2011

(65) Prior Publication Data

US 2013/0145541 A1  Jun. 13, 2013

(51) Int. Cl.
*A61H 33/06* (2006.01)

(52) U.S. Cl.
USPC .............................................. 4/524

(58) Field of Classification Search
CPC ...................................... A61H 33/06
USPC ................. 4/524–534, 476; 601/66
See application file for complete search history.

(56) References Cited

U.S. PATENT DOCUMENTS

| 3,588,470 | A | * | 6/1971 | Husband | 392/386 |
| 7,559,095 | B2 | | 7/2009 | Tei et al. | |
| 2011/0113545 | A1 | * | 5/2011 | Driessen | 4/476 |

* cited by examiner

*Primary Examiner* — Lori Baker
(74) *Attorney, Agent, or Firm* — Hayes Soloway PC

(57) ABSTRACT

A mobile recreational vehicle mounted sauna which in one embodiment is wood-fired to provide the super heated atmosphere associated with russian saunas as well as the ambience thereof, with the mobile sauna being provided with cold showers to simulate jumping into a cold lake or river. A bi-fuel capability is provided in one embodiment in which the firebox of the heater is provided with an extension so that its orifice extends to the exterior of the recreational vehicle so that the wood can be conveniently loaded into the firebox, or so that a propane heating element can be inserted into the firebox, with the sauna being operable in one embodiment during transit.

17 Claims, 6 Drawing Sheets

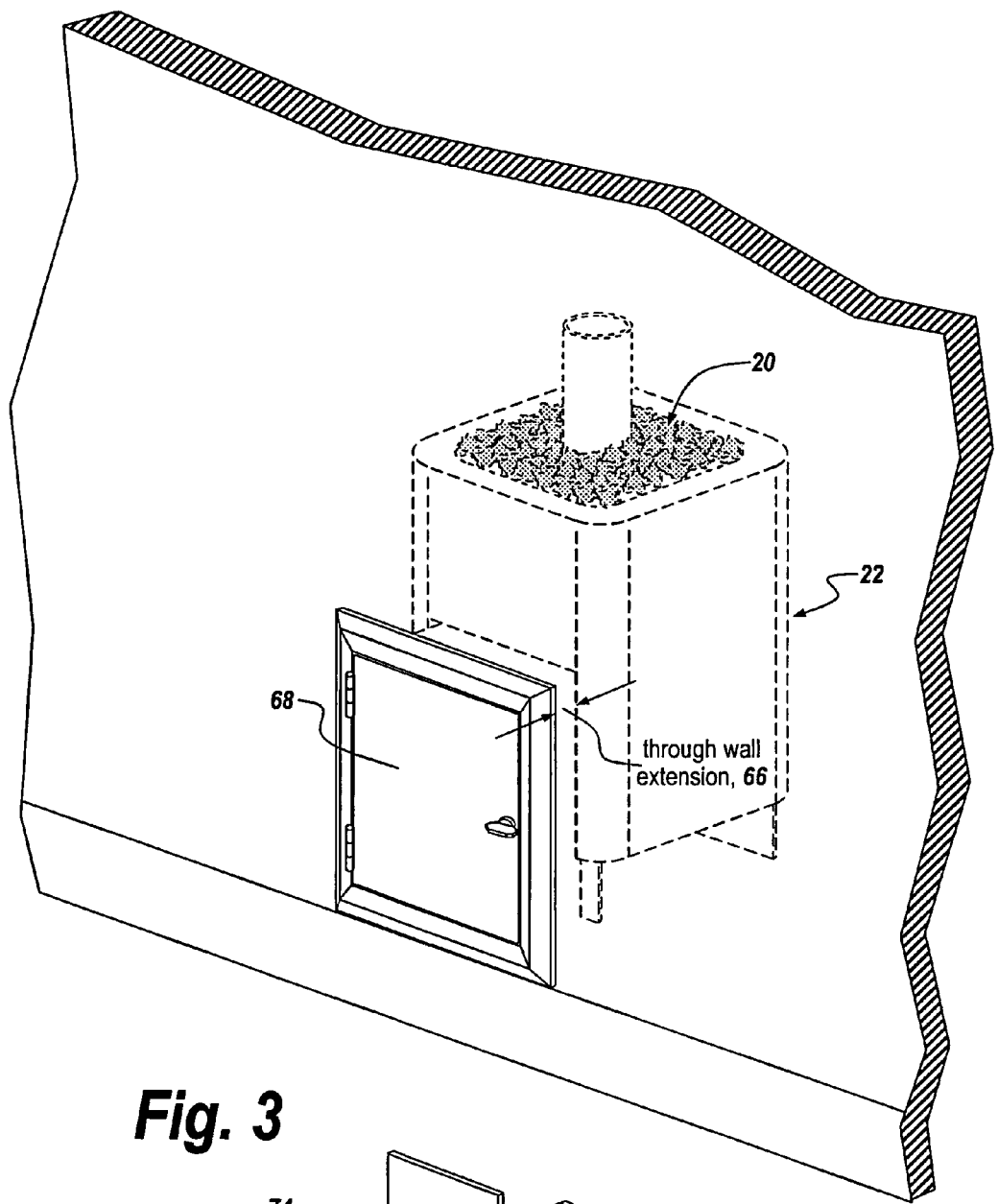
Fig. 3
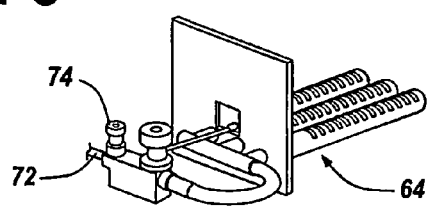

RV MOUNTED SAUNA

FIELD OF THE INVENTION

This invention relates to saunas and more particularly to a mobile sauna carried by a recreational vehicle.

BACKGROUND OF THE INVENTION

As is common throughout Russia and most of the Baltic countries saunas are utilized both for pleasure and for therapeutic value. Saunas in the Soviet Union and the Russian landscape saunas are conveniently located near ponds or places where people recreate so that people participating in the sauna may bathe in the cold weather of an adjacent lake or roll in the snow adjacent the sauna. Moreover, saunas are positioned in the wintertime near fishing shacks or ice fishing facilities such that after the sauna the individual can jump through a hole in the ice, thereby achieving the therapeutic benefit of being heated to high degree and then experiencing a rapid drop in temperature.

Another typical characteristic of saunas in Russia or the former Soviet Union is that saunas are often wood-fired and are heated to a temperature in excess of 260 degrees Fahrenheit, an exceedingly high temperature and one not typically achieved by the electric saunas that are installed in the United States. The use of the wood permits reaching a very high temperature, with the wood burning causing a pleasing aroma to waft through the sauna, while at the same time providing for the sounds of crackling and the like, all of which enhance the sauna experience.

Also saunas are typically located in woodland or remote scenic regions in Russia which serve as a getaway for the Russian populace, away the city and away from the readily availability of electricity. In short, traditional Russian saunas are wood fired, located remotely preferably adjacent bodies of water, and are to a large extent wood-fired to provide both the traditional experience of taking a high temperature sauna while at the same time being therapeutic.

However, in places where saunas are not plentiful, such in the United States, there is a need to provide for the same type of experience as one would have in the Russian countryside.

Present day saunas are usually fixed structures within a building and are electric powered. As a result such saunas cannot reach the temperatures associated with wood-fired saunas. The buildings which house the saunas are typically not in a woodland setting and are not wood-fired. Moreover, saunas in such buildings do not provide the ambience of a wooded or other scenic area much less one adjacent a lake or a cold spring. Moreover the sauna may not be accessible to the elderly who may be in need of the type of therapy provided by the sauna experience.

There is therefore a need to provide the off grid woodland experience for individuals on a mobile basis so that the entire ambience of a Russian sauna can be experienced without having to build a fixed sauna.

SUMMARY OF INVENTION

In order to provide for an equivalent russian sauna experience a recreational vehicle is provided with a wood-fired sauna, in one embodiment mounted to the rear of the recreational vehicle in which the sauna is surrounded by benches of abachi, a wood that remains cool in a sauna environment, a supply of water for replenishing a water bucket which is used to pour water onto the bricks of the sauna, as well as providing a separate area adjacent to the sauna within the recreational vehicle for cold showering such that if a lake or cold body of water is not available adjacent the RV, those experiencing the sauna can cool down rapidly within the recreational vehicle.

In one embodiment, the sauna heater is provided with a rear extension such that the firebox of the heater is exposed exteriorly of the recreational vehicle body. In this way wood that fires the sauna can be loaded into the sauna firebox from outside of the recreational vehicle. In so doing the sauna firebox is provided with an extension to the door normally used for inserting for instance a propane-fired heating element, with the extension permitting access to the firebox from outside the recreational vehicle. The outside access permits conveniently loading logs into the firebox from outside the recreational vehicle.

This permits driving the recreational vehicle to a remote location and providing a source of fuel derived from a wooded location so that the benefits of a wood-fired sauna is achieved once the recreational vehicle is parked at a suitable scenic remote site.

The sauna heater in one embodiment is a bi-fuel heater which can accommodate both wood firing and gas firing as for instance by propane fired heater elements inserted into the cavity where wood would ordinarily be placed and burned.

By outfitting the recreational vehicle in the manner described above it is possible to provide the sauna experience in a remote location which may or may not have electricity available, but which provides a total russian sauna experience when the recreational vehicle arrives on scene at the desired remote location.

It is noted that since the sauna may be both gas-fired and wood-fired, it is possible to heat up the sauna while the recreational vehicle is en route towards the intended destination. In so doing it is possible to insert the propane burners into the firebox and provide them with propane for fueling the heater while in transit, with the propane heater assembly being removed when on location and wood accessible at the remote location used to fuel to maintain the heat of the sauna.

In this manner individuals seeking the Russian sauna experience may be transported by the recreational vehicle to a remote location, again preferably by a lake or source of cold water, take the sauna and then jump into the lake adjacent the recreational vehicle.

Moreover, the subject system can be used by elderly individuals, mobile enough to enter the recreational vehicle so that they can be transported to a remote location and then experience the russian sauna as it was meant to be experienced but without having to construct a fixed sauna.

Alternately, the recreational vehicle may be provided as a mobile health care facility in which the russian sauna experience may be transported directly to the individual requiring the sauna experience such as aging individuals, for instance in a senior facility. In this instance the sauna may be preheated during transport to the senior facility, whereas wood may be added from the exterior of the recreational vehicle into the sauna firebox when the recreational vehicle is parked next to the senior facility. As a result the aroma, sparks and high heat associated with the burning of the wood provide the needed therapy for the inhabitants of the senior facility.

Since the recreational vehicle is provided with a cold shower area adjacent the sauna the russian sauna experience of taking a sauna then being rapidly cooled can be provided within the recreational vehicle itself.

What is therefore provided is a mobile recreational vehicle mounted sauna which in one embodiment is wood-fired to provide the super heated atmosphere associated with russian saunas as well as the ambience thereof, with the mobile sauna being provided with cold showers to simulate jumping into a cold lake or river. A bi-fuel capability is provided in one embodiment in which the firebox of the heater may be provided with an extension so that its orifice extends to the exterior of the recreational vehicle so that the wood can be conveniently placed into the firebox, or so that a propane heating element can be inserted into the firebox, with the sauna being operable in one embodiment during transit.

BRIEF DESCRIPTION OF THE DRAWINGS

These and other features of the subject invention will be better understood in connection with the Detailed Description in conjunction with the Drawings of which:

FIG. 3 is a diagrammatic illustration of the sauna of FIG. 1 being provided with an extension such that the firebox of the sauna is accessible from the exterior of recreational vehicle, also illustrating the alternative of inserting a propane heater assembly through the extension and into the firebox of the sauna;

DETAILED DESCRIPTION

Figure 1:
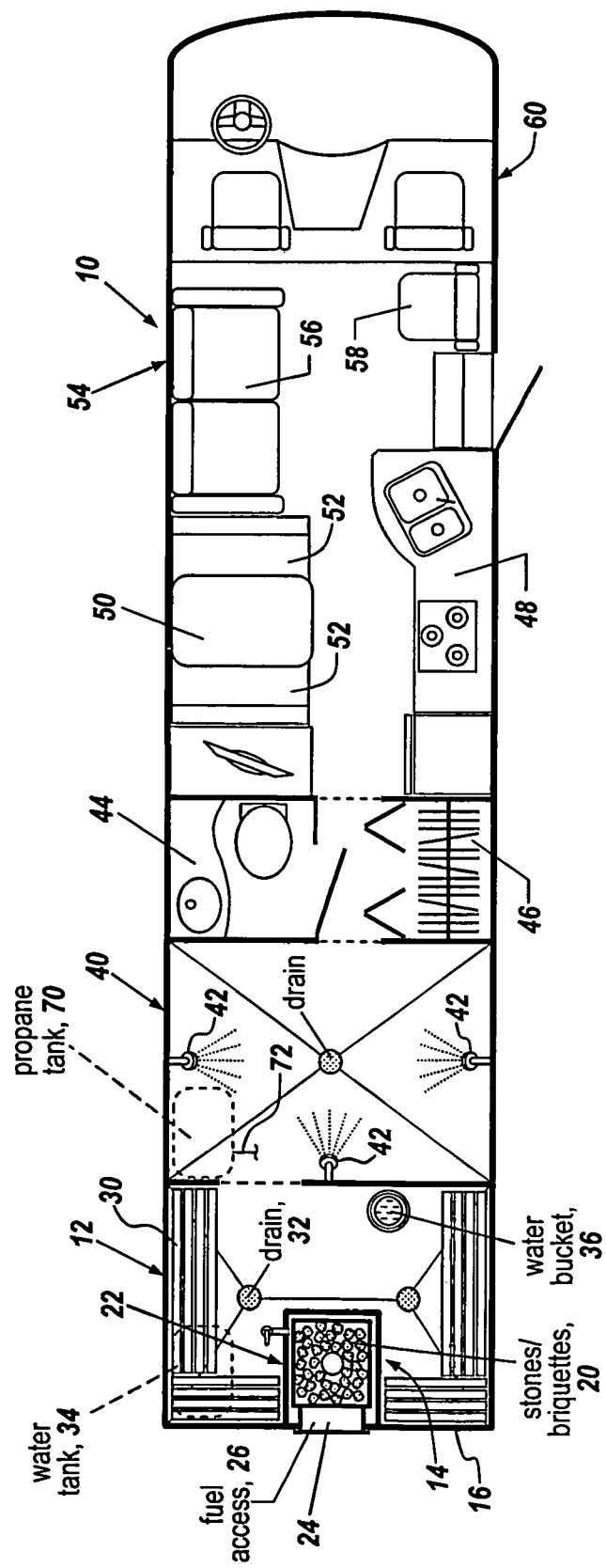
FIG. 1 is a diagrammatic top view of a recreational vehicle provided with an aft mounted sauna having a sauna firebox exposed to the exterior of the recreational vehicle body to permit loading of wood outside the recreational vehicle into the heater, with the exterior exposure of the firebox also accommodating, a propane heater assembly as an alternative source of fuel.

As can be seen from FIG. 1, a recreational vehicle 10 is provided with a sauna 12 having a heater housing 14 which is at the rear portion 16 of the recreational vehicle. The heater has a receptacle for stones, rocks or briquettes 20 which are heated by either wood or propane in a heater 22 which has an extension 24 that goes from the body of the heater to the exterior of the recreational vehicle. This extension provides fuel access via a fuel access port 26 so that wood may be loaded into the sauna heater.

The sauna 12 area is provided with benches 30 which are made from wood such as abachi wood that does not heat up so that individuals can enjoy the sauna without burning their skin. Sauna 12 is provided with a plurality of drains 32 so that when water from a water tank 34 is channeled into a water bucket 36 and is thrown on the stones or briquettes 20, any remaining water can drain out of the sauna compartment. The water from the water tank 34 may be also utilized to cool down an individual in the sauna, it being understood that the subject sauna may produce temperatures within the sauna of up to 260 degrees Fahrenheit.

Adjacent sauna 12 is a shower area 40 having shower heads 42 which are used to simulate the experience of jumping into a cold lake or stream after a sauna, should such lake or stream not be available in the vicinity of the recreational vehicle.

In one embodiment, the recreational vehicle is provided with a bathroom 44, a closet 46, and a kitchen area 48, along with a settee 50 having benches 52 for dining purposes. Outside of the kitchen area is a lounge area 54 having a sofa 56 and a chair 58, all located behind the driving compartment 60 of the recreational vehicle.

Figure 2:
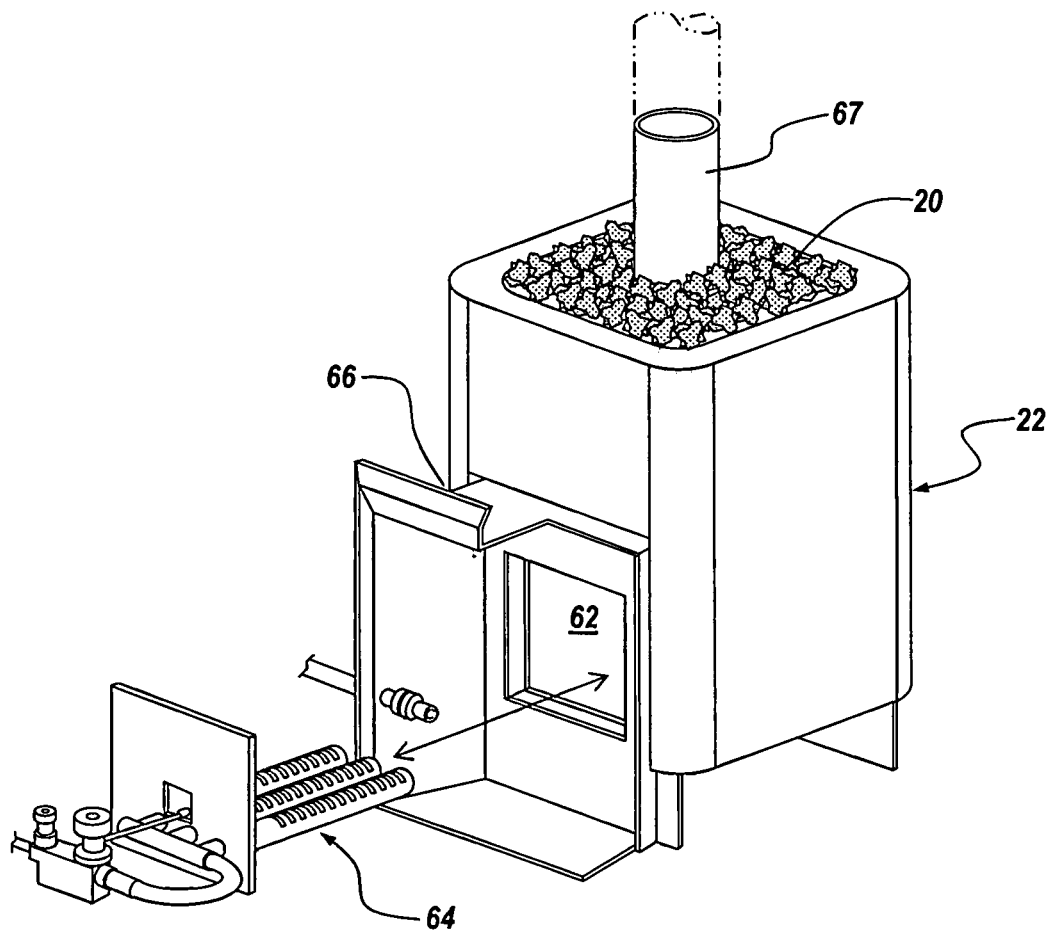
FIG. 2 is an exploded view of one embodiment of the sauna heater of FIG. 1 illustrating a fire box door and the insertion of propane heater tubes through the door for the firing the sauna.

Referring now to FIG. 2, heater 22 of FIG. 1 is shown as having an internal firebox 62 into which can be inserted a propane heater assembly 64. This propane heater assembly is inserted into the firebox through extension 66 which provides access to the firebox so that in one embodiment the subject sauna can be gas-fired from assembly 64.

It is an important feature of subject invention that extension 66 provides access from the exterior of the recreational vehicle to the firebox so that locally garnered wood can be utilized to fire the sauna.

Whether gas-fired or wood-fired, a stove pipe 67 is utilized to vent the hot gases from either the burning wood or propane out to the exterior of the recreational vehicle, with the stove pipe centered in the stones or briquettes that are at the top portion of the sauna heater.

Referring to FIG. 3 it can be seen that heater 22 is shown in dotted outline with access to the firebox being through a wall via extension 66 such that a propane heater assembly 64 or any wood gathered in the vicinity of the recreational vehicle can be burned in the heater. Moreover, as illustrated, a door 68 is provided to the exterior of extension 66 so that when the vehicle is in transit if it is desired to have the sauna preheated during transit the air flow at the back of the vehicle is prevented from entering into the firebox and putting out the fire.

It will be appreciated and as can be seen in FIG. 1 there is a propane tank 70 which has lines 72 that are connected to an injector 74 associated with the propane assembly 64. As is usual, the propane heaters are provided with safety lockout valves such that if there is too much carbon monoxide the propane heater will shut down. Also over temperature protection is provided.

Figure 4:
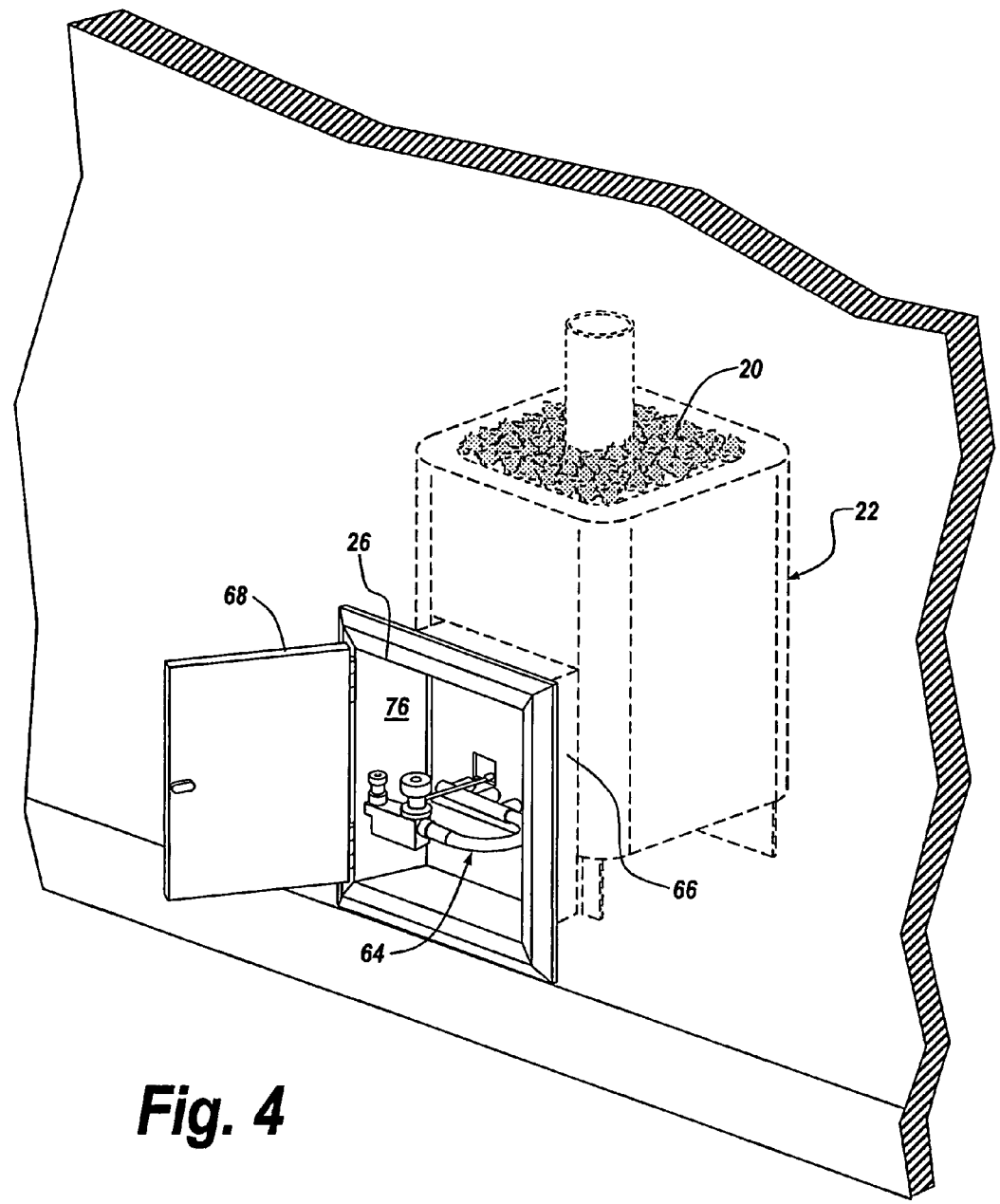
FIG. 4 is a diagrammatic illustration of the insertion through door of FIG. 3 of the propane heater assembly into the firebox of the sauna.

Referring to FIG. 4, it can be seen that propane heater assembly 64 is installed such that its nozzles are within the firebox of heater 22 after having been inserted through the fuel access port 26, having opened door 68. The fuel from propane tank 70 via line 72 may be provided either through a wall 76 or through extension 66, or the propane line may be run externally of the recreational vehicle.

Figure 5:
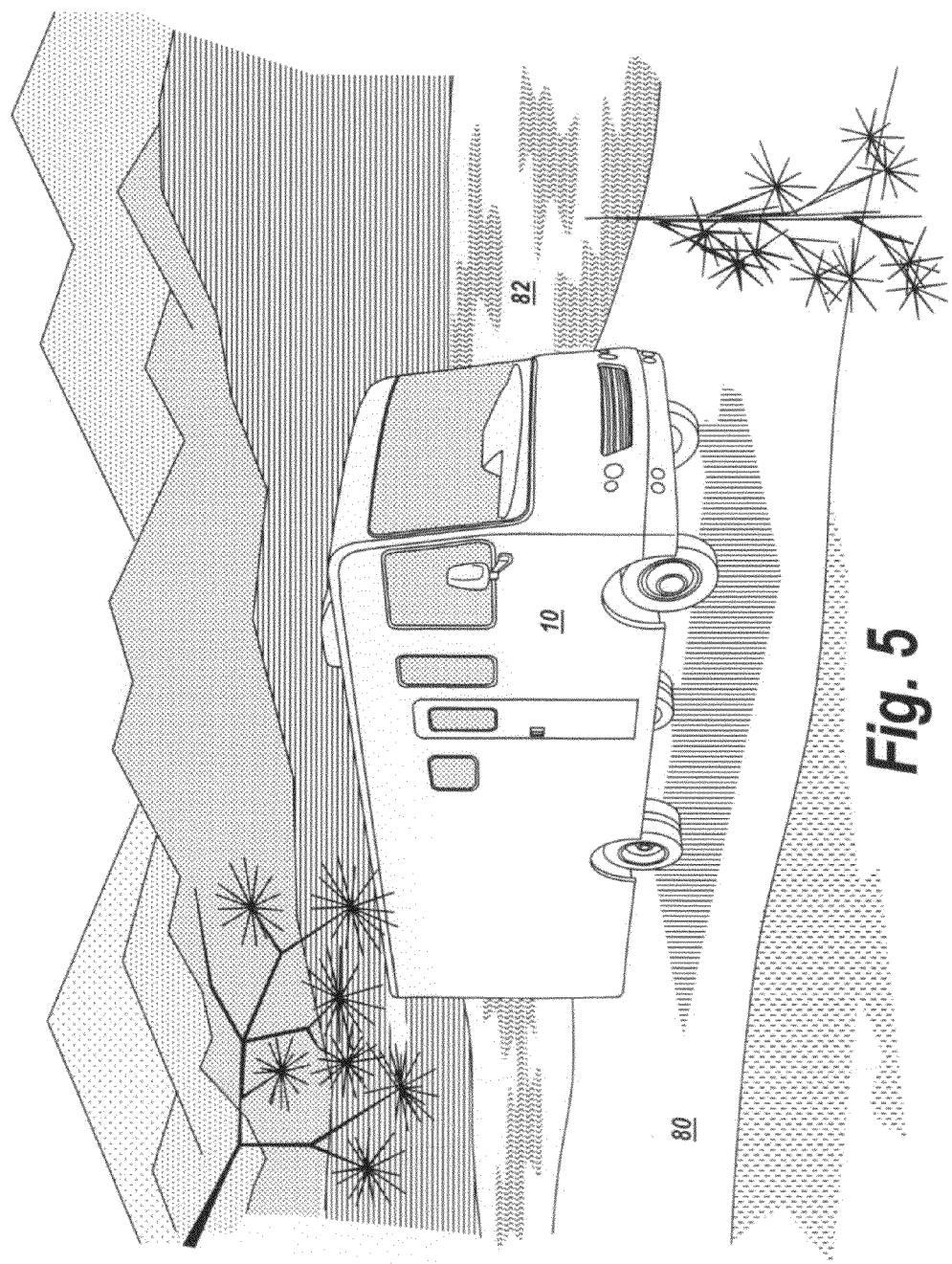
FIG. 5 is a diagrammatic illustration of a recreational vehicle that has been retrofitted with the sauna of FIG. 1, illustrating its proximity to a scenic wooded area and a lake.
Figure 6:
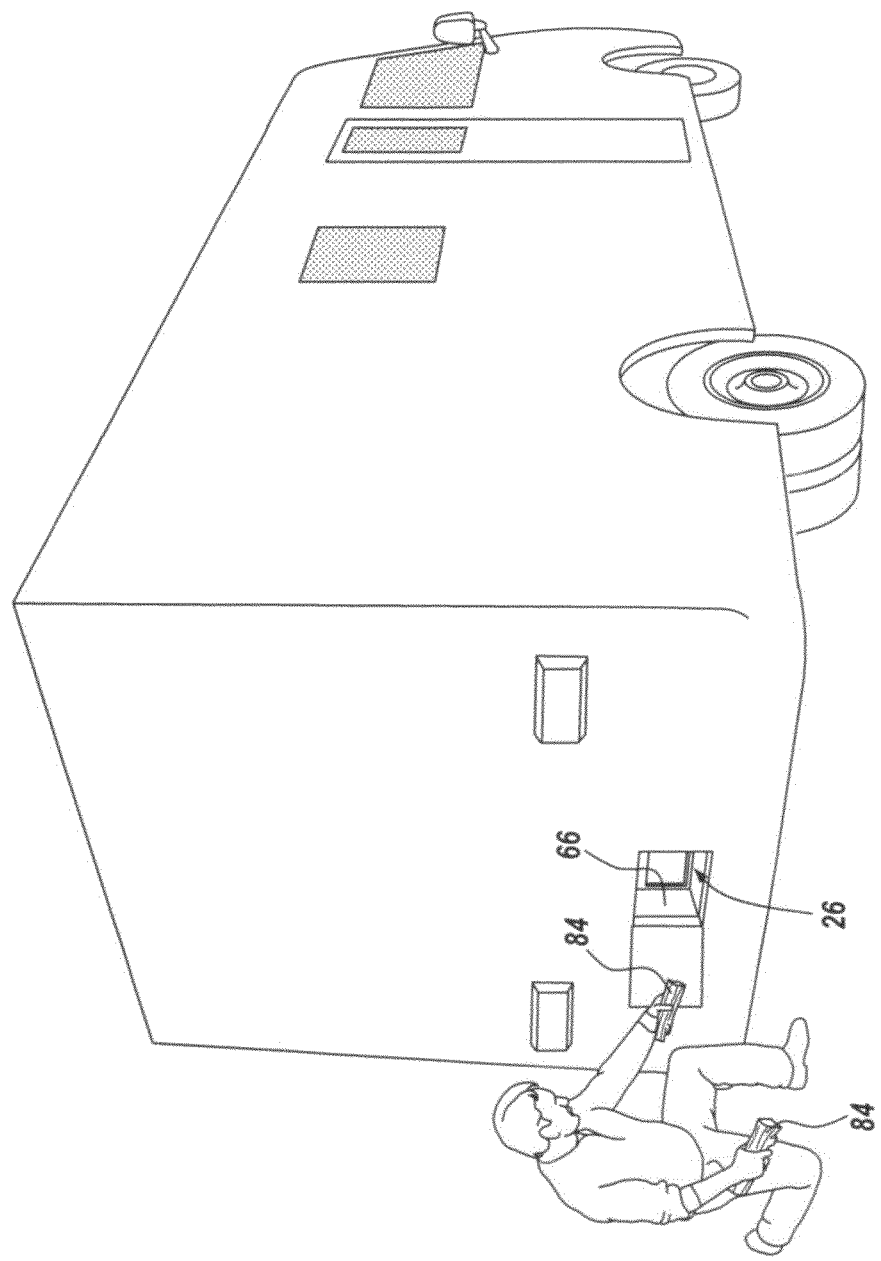
FIG. 6 is a diagrammatic illustration of the loading of wood from the exterior of the recreational vehicle into the firebox of the sauna that lies within the recreational vehicle so as to be able permit heating the sauna up to as much as 260 degrees F. while at the same time providing the smoke and the crackling experience of a wood fired sauna.

As can be seen in FIG. 5, recreational vehicle 10 may be driven to a wooded location 80 in which there may be a lake 82 or stream into which sauna participants may bathe. Note the recreational vehicle may be transported to a scenic remote location at which there is no electricity and no other sauna facility.

While the recreational vehicle may have its own supply of fuel for the sauna, conveniently wood 84 may be gathered at the scenic location and placed into the sauna heater through extension 66 and fuel access port 26 so the fuel for the sauna need not be transported but rather gathered locally.

Since the sauna is not electrically powered in the subject invention, it is possible for the sauna heater to be heated to in excess of 260 degrees Fahrenheit through the utilization of a very hot wood fire or in fact the utilization of the aforementioned propane fuel. This provides the sauna user with the russian experience of an extremely hot sauna, clearly hotter than that is available from electrical power heat generation.

Whether a sauna is used for a recreational purposes or for therapeutic purposes it will be appreciated that recreational vehicle passengers may be transported from for instance a city to a scenic location where transported individuals may experience a sauna in a pastoral environment.

It will be appreciated that the stove pipe 67 is provided with surrounding insulation to be able to sustain the 260 plus Fahrenheit heat temperatures and further that the sauna may be anchored to the sides of the recreational vehicle body through insulating members so as not to overheat the recreational vehicle body.

In summary, what is provided is a mobile sauna which is outfitted so as to be able to wood-fire the sauna heater by gathering wood at a scenic site and firing the sauna with the gathered wood. It also has a bi-fuel capacity in which propane carried by the recreational vehicle may be used to fuel the sauna. The sauna is also provided with accoutrements such as cold showers and water supply to enhance the sauna experience.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A mobile recreational vehicle mounted sauna comprising:
    a recreational vehicle having a vehicle body with a floor, roof and sidewalls;
    a wood-fired sauna including a heater mounted in the rear of said recreational vehicle, said heater having a firebox exposed at a heater orifice, and an extension from said heater orifice through one of said sidewalls of said recreational vehicle and opening to the exterior of said recreational vehicle such that wood gathered in the area of said recreational vehicle can be inserted from the exterior of said recreational vehicle to said firebox through said extension;
    wherein and further including a stove pine mounted above said heater, said stove pipe surrounded by an insulating material, said stove pipe extending through the roof of said recreational vehicle with said insulating material between said stove pipe and said roof.

2. The apparatus of claim 1, wherein said sauna is a bi-fuel sauna.

3. The apparatus of claim 2, wherein said bi-fuel sauna may be heated by either wood or a gas.

4. The apparatus of claim 3, wherein said gas is one of natural gas or propane.

5. A mobile recreational vehicle mounted sauna comprising:
    a recreational vehicle having a vehicle body with a floor, roof and sidewalls;
    a wood-fired sauna including a heater mounted in the rear of said recreational vehicle, said sauna being at least one of a wood-fired and gas-fired sauna, said heater having a firebox exposed at a heater orifice, and an extension from said heater orifice through one of said sidewalls of said recreational vehicle and opening to the exterior of said recreational vehicle such that wood gathered in the area of said recreational vehicle can be inserted from the exterior of said recreational vehicle to said firebox through said extension, wherein said recreational vehicle carries a supply of gaseous fuel and further including a gas line between said supply and a gas injection assembly.

6. The apparatus of claim 5, wherein said gas injection assembly is inserted into said firebox through said extension.

7. The apparatus of claim 6, wherein said gas is delivered to said gas injection assembly from said gas source by a line extending to said assembly through said extension.

8. The apparatus of claim 1, and further including a shower stall having shower heads, said shower stall being adjacent said sauna between the sauna area and the front of said recreational vehicle, said shower stall including a drain and further in a supply of cold water coupled to said shower heads stall.

9. The apparatus of claim 1, wherein said sauna has rocks and further including a separate supply of water adjacent said sauna, said supply having an outlet and further including a bucket for receiving water from said supply for pouring over the rocks of said sauna.

10. The apparatus of claim 1, wherein said sauna is heated to temperatures up to 260 degrees Fahrenheit and further including wooden benches in said sauna adjacent said heater that remain cool to the touch in the presence of a heated sauna environment.

11. The apparatus of claim 10, wherein said wooden benches are made from abachi.

12. A method of providing a Russian sauna experience to individuals, comprising the steps of:
    providing a recreational vehicle with a sauna in the rear thereof;
    driving said recreational vehicle with said individuals to a designated area; and
    providing the sauna with a gas-fired burner and a supply of gas within the recreational vehicle and further including the step of turning on the sauna during transit by lighting the gas-fired burner such that the sauna is heated during transit and is ready when the recreational vehicle is parked at the designated area.

13. The method of claim 12, wherein said designated area includes a scenic location adjacent a cool body of water, whereby the individual after experiencing the sauna can exit the recreational vehicle and bathe in the cool body of water.

14. The method of claim 12, and further including providing the sauna with a heater having a firebox orifice connected to the exterior of the recreational vehicle through an orifice in a recreational vehicle wall such that wood may be loaded from the exterior of the recreational vehicle through a recreational vehicle wall into the firebox.

15. The method of claim 14, wherein the firebox orifice is connected to the exterior of the recreational vehicle wall utilizing an extension that passes through the recreational vehicle wall.

16. The method of claim 15, and further including a door covering the opening of the extension through the recreational vehicle wall to prevent air from entering the firebox when the recreational vehicle is in motion and the sauna is being heated during transit.

17. The method of claim 12, and wherein the sauna includes rocks a separate source of water adjacent the sauna and further including the step of taking water from the separate supply and throwing it onto the sauna rocks for increasing humidity of the sauna or for throwing the water on the individual to cool down the individual when the individual is in the sauna.

* * * * *

UNITED STATES PATENT AND TRADEMARK OFFICE
CERTIFICATE OF CORRECTION

PATENT NO.         : 8,950,018 B2
APPLICATION NO.    : 13/374044
DATED              : February 10, 2015
INVENTOR(S)        : Nikita Krasilnikov Page 1 of 1

It is certified that error appears in the above-identified patent and that said Letters Patent is hereby corrected as shown below:

In the Claims

Col. 5, Claim 1, Line 41, "stove pine" should be "stove --pipe--".

Signed and Sealed this
Ninth Day of June, 2015

Michelle K. Lee
*Director of the United States Patent and Trademark Office*